United States Patent [19]
Grochowicz

[11] 3,841,756
[45] Oct. 15, 1974

[54] APPARATUS FOR MILK PRODUCTION ANALYSIS

[75] Inventor: Peter S. Grochowicz, Puyallup, Wash.

[73] Assignee: Clark M. Runyan, Ellensburg, Wash. ; a part interest

[22] Filed: Jan. 26, 1973

[21] Appl. No.: 327,008

Related U.S. Application Data

[63] Continuation of Ser. No. 141,758, May 10, 1971, abandoned.

[52] U.S. Cl. ............... 356/72, 23/258, 119/14.17, 119/14.18, 324/30 R, 356/201
[51] Int. Cl. ........................................... G01n 21/24
[58] Field of Search ........... 119/14.03, 14.14, 14.15, 119/14.16, 14.17, 14.18; 23/258; 324/30 R; 252/408; 356/36, 72, 73, 201, 204–206

[56] References Cited
UNITED STATES PATENTS

| | | | |
|---|---|---|---|
| 2,560,059 | 7/1951 | Young | 119/14.17 X |
| 2,631,566 | 3/1953 | Roop | 119/14.18 X |
| 2,752,815 | 7/1956 | Batchelor | 23/258 X |
| 2,898,549 | 8/1959 | Miller | 119/14.15 |
| 2,998,392 | 8/1961 | Schalm et al. | 252/408 |
| 3,030,569 | 4/1962 | Chilton | 323/75 |
| 3,159,138 | 12/1964 | Olsson | 119/14.17 X |
| 3,566,841 | 3/1971 | Gerrish et al. | 119/14.5 |

FOREIGN PATENTS OR APPLICATIONS

| | | | |
|---|---|---|---|
| 1,190,432 | 6/1970 | Great Britain | 119/14.14 |
| 120,679 | 0/1959 | U.S.S.R. | 23/258 |

OTHER PUBLICATIONS

Greatix et al.: "Journal of Dairy Research," 1967, pages 213–221.

Primary Examiner—Ronald L. Wibert
Assistant Examiner—F. L. Evans
Attorney, Agent, or Firm—Graybeal, Barnard, Uhlir & Hughes

[57] ABSTRACT

In a cow milking operation where there is a plurality of milking stations, an apparatus for monitoring and recording individual milk production. At each transfer station where there is a container to collect the individual cow's milk production, there is an individual monitoring unit which senses (a) the leukocyte content of the milk, (b) the butterfat content, and (c) the weight of the milk. Also there is a device for entering the cow's identification number. This information is transmitted to a single master unit which prints each cow's number along with the leukocyte, butterfat and weight information from the cow's production for each milking.

12 Claims, 9 Drawing Figures

PETER S. GROCHOWICZ
INVENTOR.

BY Grayheal, Cole & Barnard
ATTORNEYS

FIG. 7

| COW NO. | MILK WT. | BUTTERFAT CONTENT | LEUKOCYTE COUNT |
|---|---|---|---|
| 034 | 224 | 37 | 251 |
| 041 | 310 | 41 | 125 |
| 124 | 265 | 43 | 105 |

APPARATUS FOR MILK PRODUCTION ANALYSIS

This is a continuation application Ser. No. 141,578, filed May 10, 1971, now abandoned.

BACKGROUND OF THE INVENTION

1. Field of the Invention

This invention relates to a method and apparatus of analyzing milk production in a cow milking operation.

2. Description of the Prior Art

The prior art has developed means for measuring the weight, butterfat content and leukocyte content of milk.

For example, U.S. Pat. No. 2,752,815, to Batchelor, discloses the broad concept of determining the butterfat of milk by measuring light transmissibility through the milk.

U.S. Pat. No. 2,998,392, to Schalm et al., recognizes the importance of determining the leukocyte content of milk and also relates this to the pH of the milk. It further provides a means of taking a sample of milk and provides a testing solution to determine the leukocyte content. Also, there exists in the prior art indicators which are adapted to be mounted to milk containers which provide an alarm signal, i.e., dump signal, when the leukocyte content reaches a predetermined level.

There are, of course, many devices in the prior art which are capable of weighing milk. For example, U.S. Pat. No. 3,030,569, issued to Chilton, discloses the concept of using a potentiometer to give a remote digital indication of the weight.

However, to the best knowledge of the applicant herein, there does not exist in the prior art a practical method and apparatus for monitoring these characteristics on an individual cow basis in an actual day-to-day milk production operation.

SUMMARY OF THE PRESENT INVENTION

In the present invention there is at each one of a plurality of milking stations an individual milk analyzing unit. Each unit comprises: (a) a butterfat indicating device, (b) a leukocyte indicating device, and (c) a quantity indicator, which in the preferred form is a weight indicator. At each station there is also a cow identifying device. These four devices are operatively connected to an individual transfer station container which receives the yield of a single cow being milked. A single central master recorder assimilates the information from the individual units and provides a readout of the milk production of the individual cows for each milking. This readout relates the individual cow's identifying number to the butterfat, weight and leukocyte content of that particular cow's production.

The butterfat indicating device comprises a light transmitter and a photocell spaced therefrom, both of which are located in the transfer station container. There is an output voltage proportional to the light transmitted to the photoelectric cell, which in turn is inversely proportional to the butterfat content of the milk.

The leukocyte indicating device comprises two electrodes located in the container and spaced a short distance apart from each other. If the leukocyte content increases, the pH factor of the milk will drop, i.e., the milk will become acidic, and there will be greater electrical conductivity between the electrodes. The increased flow of current between electrodes is made proportional to an output voltage.

The weight of the cow's milk production is determined by mounting the container on a spring and measuring the deflection of the same by means of a potentiometer which provides a voltage proportional to the weight of the milk in the container.

When the milking of a particular cow has been completed and it is desired to transmit the readings from a particular batch of milk, the individual cow's number is entered into the cow number transmitter of that unit. An activating switch is closed to transmit information corresponding to the cow's number, along with the three voltages representing the three aforementioned milk characteristics. At the master unit the three individual voltages are individually translated into a digital output which is in turn communicated to a printer. The printer makes a printout of the cow's number, the weight of her milk, its leukocyte content, and its butterfat content.

Thus, this invention provides the dairyman with means for more effective management of his herd. For example, since infection in the cow's milk system is detected by the presence of leukocytes, with the daily monitoring of leukocyte content, the dairyman can detect incipient infection and take the proper physical and/or medical precautions to eliminate the presence of the infection before it becomes a major problem. Further, since some cows are inherently more susceptible to mammary system infections and transmit this condition genetically to their offspring, the daily monitoring of leukocytes will provide the dairyman with knowledge for more advantageous selection of heifer calves to be held for herd replacement and improvement.

Further, by daily measurement of the weight and butterfat content of the cow's milk production, the dairyman can be more cost effective in the feeding of his cows. Since most all dairymen know the volume of feed and concentrates fed each cow, by comparing this with the individual milk production, the dairyman can prevent overfeeding or underfeeding, change feeds or add supplements, make cow-to-cow comparisons, and select those offspring which genetically have the possibility for good production of milk and butterfat.

DESCRIPTION OF THE PREFERRED EMBODIMENT

Figure 1:
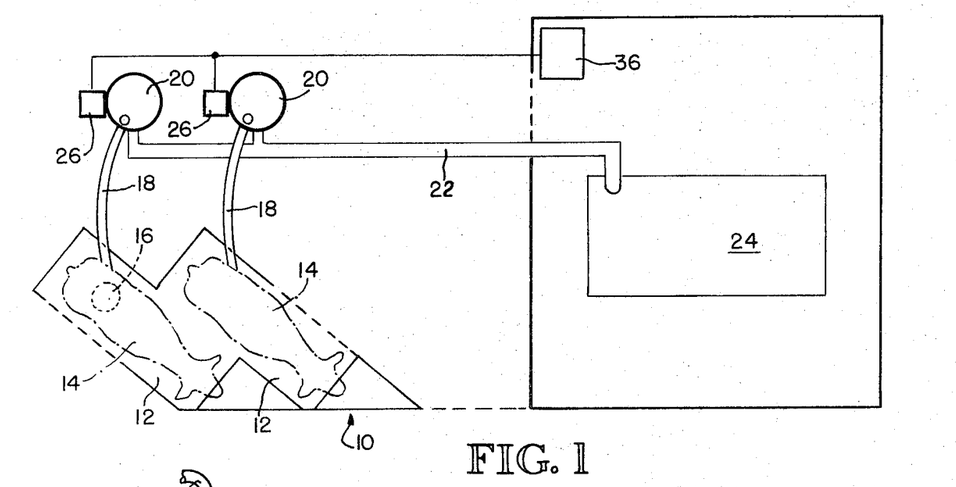
FIG. 1 is a semi-schematic top plan view illustrating a milk parlor incorporating the appratus of the present invention.

FIG. 1 illustrates a milking parlor incorporating the apparatus of the present invention. The milking parlor 10 has a plurality (e.g. eight) of milking stations, two of which are shown at 12, at each of which a cow 14 is shown in position for milking. At each milking station 12 there is a milk machine, one of which is indicated schematically at 16. Milk from the milking machine 16 is fed through a line 18 to a transfer container 20. Milk from the several transfer containers 20 is fed through a single main milk line 22 to a bulk tank 24 in the milk room next to the parlor 10.

Figure 2:
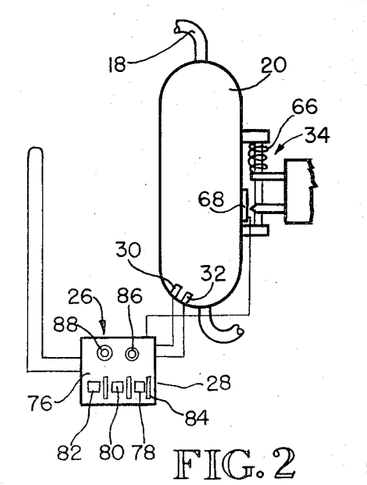
FIG. 2 is a semi-schematic side elevational view of a single milk analyzing unit.

At each transfer station, i.e., at each location of a transfer container 20, there is a milk analyzing unit 26 and a cow identifying device 28 physically mounted to the unit 26. The analyzing unit 26 comprises a butterfat sensing device 30, a leukocyte sensing device 32, and a weight sensing device 34. Informational signals from the milk analyzing unit 26 and the cow identifying device 28 are transmitted to a master unit 36 which provides an informational output of each cow's identifying number along with the butterfat content, leukocyte content and weight of that individual cow's production. In the particular embodiment shown herein, this is provided as a printout 38 such as that indicated in FIG. 9.

Figure 3:
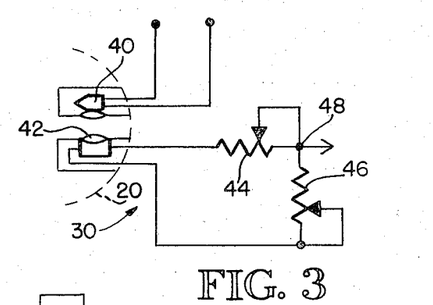
FIG. 3 is a diagrammatic view of the butterfat sensing device of the unit of FIG. 2.

FIG. 3 illustrates the butterfat sensing device 30. Located within the transfer container 20 is an infrared transmitter 40 and a photoelectric cell 42 spaced a short distance therefrom. Light from the transmitter 40 strikes the photocell and causes a current to flow through two variable resistors 44 and 46. A voltage signal is picked off at a point 48 between the two resistors 44 and 46 to provide a signal corresponding to the butterfat content of the milk in the container 20. When there is higher butterfat content, less light will strike the photoelectric cell, with the result that there will be less current through the resistors 44 and 46, and the signal voltage at point 48 will be lower. In the instance where there is lower butterfat content in the milk, there is greater transmissibility from the transmitter 40 to the photoelectric cell 42. By varying the resistances of the two resistors 44 and 46, the output signal from point 48 can be properly calibrated.

Figure 4:
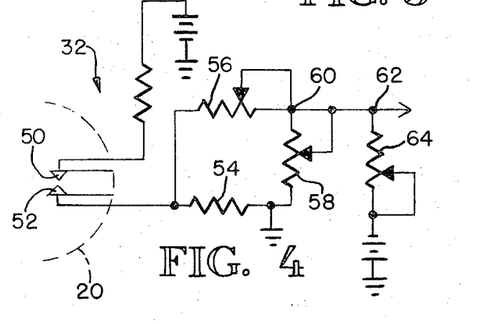
FIG. 4 is a diagrammatic view of the leukocyte sensing device of the unit of FIG. 2.

The leukocyte sensing device is illustraated in FIG. 4 and comprises a pair of electrodes 50 and 52, spaced a short distance apart from each other and also located in the lower part of the transfer container 20. A voltage is imposed upon the electrode 50 with the other electrode 52 being connected to ground through a resistor 54. The electrode 52 is also connected through another path to variable resistors 56 and 58 to ground, with a signal voltage being taken off at a point 60 between the resistors 56 and 58. Since milk having even a very low leukocyte content is somewhat conductive, a negative voltage is supplied at 62 through a variable resistor 64 to the signal point 60. As the leukocyte content of the milk increases, the pH of the milk drops, which in turn makes the milk more electrically conductive. Hence, there will be a greater current flowing through the two variable resistors 56 and 58, with a higher voltage signal at point 60 to indicate the higher leukocyte content of the milk. By properly setting the variable resistors 56, 58 and 64, an appropriate output signal can be provided at the signal source 60.

Figure 5:
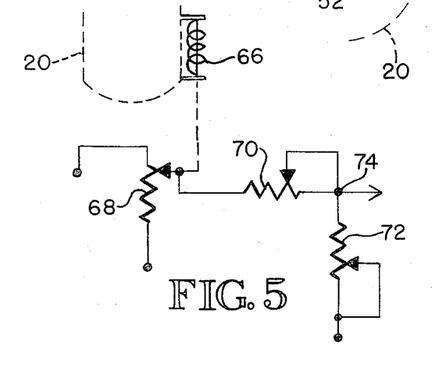
FIG. 5 is a diagrammatic view of the weight sensing device of the unit of FIG. 2.

The weight indicating device is shown schematically at FIG. 5. The transfer container 20 is supported by a spring 66 so that the container 20 moves downwardly as the amount of milk therein increases. The amount of downward movement of the container 20 is measured by a potentiometer 68, and the voltage from the potentiometer 68 is fed through a pair of variable resistors 70 and 72. The output signal is taken from a point 74 located between the resistors 70 and 72.

The aforementioned cow identifying device 28 is, in the particular embodiment herein, mounted to the same box 76 as is the circuit components of the aforementioned sensing devices 30, 32 and 34. Since milk cows are ordinarily identified by a number, and since the quantity of cows in a milking operation is generally less than a thousand, the cow identifying device 28 as shown herein, comprises three numerical decimal inputs, namely, a unit input 78, a 10 input 80 and a 100 input 82. Each of the numerical inputs 78, 80 and 82 has a respective selecting dial 84 by which the appropriate number i.e., 0 through 9 can be entered into the particular input 78, 80 and 82.

As indicated previously, when an individual cow has been milked, and her milk production is in the associated container 20, the milk analyzing unit 26 obtains three signal inputs from, respectively, the butterfat sensing device 30, the leukocyte sensing device 32 and the weight sensing device 34. The cow identifying number is entered on the identifying device 28. (For example, cow number 136 would be entered by placing the hundred input 82 at 1, the 10 input 80 at 3 and the unit input 78 at 6). Next, an activating switch is closed by pushing a button 86, which accomplishes four things. First, it signals the master unit 36 to receive input signals. Secondly, it activates a warning light 88, which is on each of the boxes 78 of the several milk analyzing units 26, to indicate that the apparatus is in use. Thirdly, it transmits the cow identification number to the master unit 36. Fourth, it transmits three signals from the milk analyzing unit 26, which signals correspond to, respectively, the butterfat content, leukocyte content, and weight. As will be described hereinafter, the function of the master unit 36 is to record and present this information for later analysis of individual milk production of the cows.

Figure 6:
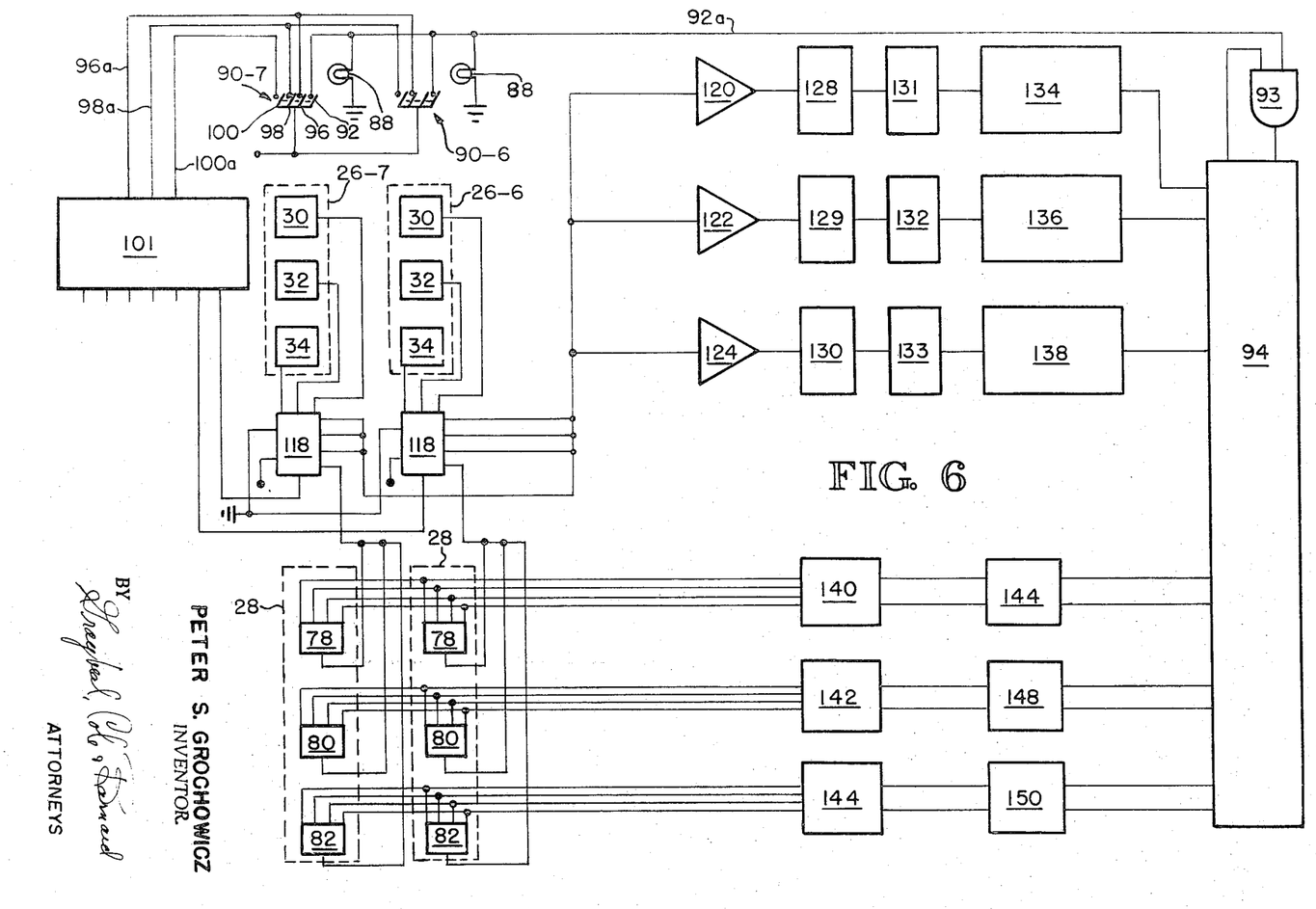
FIG. 6 illustrates the circuitry of a first embodiment of the present invention.

The particular circuitry of the first embodiment by which the above functions are accomplished is illustrated in FIG. 6. It will be understood that each milk transfer station, i.e., the location of a transfer container 20, two of which are shown in FIG. 1, has a milk analyzing unit 26 and cow identifying device 28, and these are, with the exception of the logic coding of its switch) substantially identical. Hence, the circuitry for only two of these (specifically, those at stations 7 and 6) will be described in detail herein.

The activating switch for each of the eight stations (0 through 7) is indicated at 90, and is given an additional station identification. (Hence, switches 90-7 and 90-6 are shown herein.) Each switch 90 has a first switching element 92 which makes contact when the switch 90 is closed. This switching element 92 applies a voltage to a single line 92a, to which all the lights are connected in parallel to light all the warning lights 88 on each of the eight boxes 76. It also transmits a "print enable" signal to an AND gate 93 connected to a printer 94 located in the master unit 36. Each switch 90 has three other switching elements 96, 98 and 100, selected ones of which make contact in accordance with the binary coding indicating the identifying number of that particular transfer station. For example, at switch 90 - 7, all three elements 96, 98 and 100 make contact with their respective leads 96a, 98a and 100a to transmit a binary signal, 1-1-1, which corresponds to decimal "7" which indicates station 7. Swithc 90 - 6 transmits a binary signal, 0-1-1, which corresponds to decimal 6. Each of the other switches 90 makes contact to initiate a binary coded signal corresponding to the station number of that particular switch and transmits this signal to a logic unit 101, shown in FIG. 7, via the lead 96a, 98a and 100a.

Figure 7:
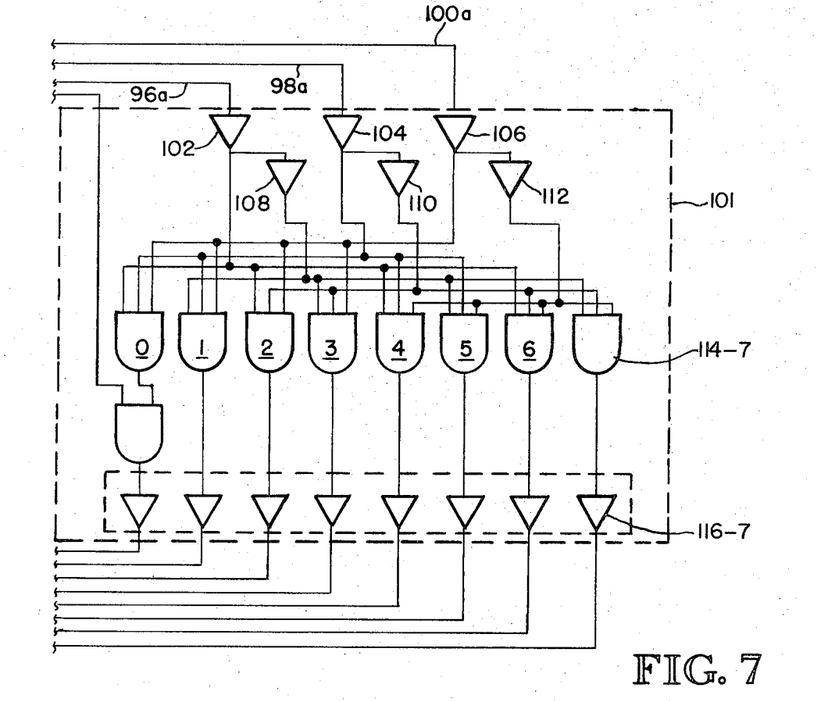
FIG. 7 illustrates the logic unit of the circuitry of FIG. 6.

With reference to FIG. 7, the three leads 96a, 98a and 100a carrying the logic signals from the eight switches 90 are connected to, respectively, three inverters 102, 104 and 106. Each inverter 102, 104 and 106 in turn leads to a respective second inverter 108, 110 and 112 and also leads to a selected one or more of eight AND gates, 114, which are given numerical designations corresponding to the related station switch which activates that particular AND gate, i.e., 114 - 0, 114 - 1, ... 114 - 8. For example, it can be seen that when switch 90 - 7 is closed, a positive logic signal is transmitted to all three inverters 102, 104, and 106. The logic 0 signals from these three inverters 102, 104 and 106 are transmitted to the three other inverters 108, 110 and 112, each of which then produces a logic one signal, all three of which signals are transmitted to AND gate 114 - 7, which then produces an output signal. It will be seen by following the circuitry through that only AND gate 114 - 7 is activated when the switch 90 - 7 is closed. Likewise, by tracing the circuitry in similar fashion, it will be seen that by closing switch 90 - 6 only AND gate 114 - 6 is energized to transmit a logic 1 signal.

Each of the AND gates 114 transmits a signal to a respective one of eight amplifiers 116, which in turn closes a respective one of eight relays 118. When one of the relays 118 closes, it accomplishes two things. First, it transmits a signal voltage from its butterfat sensing device 30, its leukocyte sensing device 32 and its weight sensing device 34. Also, it activates its related cow indicating device 28. The three signal outputs (butterfat, leukocyte and weight) from the relay 118 are fed through respective amplifiers 120, 122 and 124. However, since the signal from the butterfat sensing device 30 is inversely proportional to butterfat content, this signal is transmitted to its operational amplifier 120 in a manner to make the amplified output signal inversely proportional to the input signal. The signal from each of the amplifiers 120, 122, and 124 is fed through respective voltage to frequency converters 128, 129 and 130, to obtain frequency outputs, each of which is in turn fed to a respective counter 131, 132 and 133, respectively, the binary output of which is fed to a respective binary-to-decimal converter 134, 136 and 138. The output from the converters 134, 136 and 138 is fed to the aforementioned printer 94.

As mentioned previously, the cow identifying device 28 comprises a unit input 78, a ten input 80 and hundred input 82. The output from each of these is a binary signal which goes to respective binary-to-decimal converters 140, 142 and 144, the outputs from which go through respective sets of amplifiers 146, 148 and 150, which in turn transmit output signals to the printer 94.

To describe the operation of the first embodiment of the present invention, let it be assumed that a herd of cows is being milked by directing the cows in sequence through the eight milking stations 12. Let is be further assumed that the milking of the cow 14 at station 12 - 7 has just been completed and the mlik production from that cow 14 is in the transfer container 20 at station 7. To record the production characteristics of that batch of milk and associate it with the particular cow's number, the operator enters the cow's number on the cow identifying device 28. Then the operator observes whether or not the warning light 88 at station 7 (or at any of the stations, since all the lights 88 will go on simultaneously) is lit. If the light is not lit, that means that the apparatus is ready for use. The operator then presses the button 86 which closes the respective switch 90 - 7, to record in the printing unit 94 a decimal output of butterfat, leukocyte content, weight and cow identification number.

Closing the switch 90 - 7 activates a logic signal through AND gate 114 - 7 which in turn closes the relay 118 - 7. Also, the closing of the switch 90 - 7 sends a print enable signal to the AND gate 93 of printer 94, and activates all the warning lights 88 throughout the 8 transfer stations. If the printer 94 is not then in operation, it also is transmitting a print enable signal to the AND gate 93, which then signals the printer 94 to print. When the relay 118 - 7 closes, signals from the butterfat sensing device 30, the leukocyte sensing device 32, and the weight sensing device 34 at station 7 are transmitted to the printing unit 96. Simultaneously, the cow identifying device 28 at station 7 is activated to transmit a binary coded signal to the three decoders 140, 142 and 144 to provide a decimal input (which is that particular cow's identifying number) to the printer.

Figure 9:
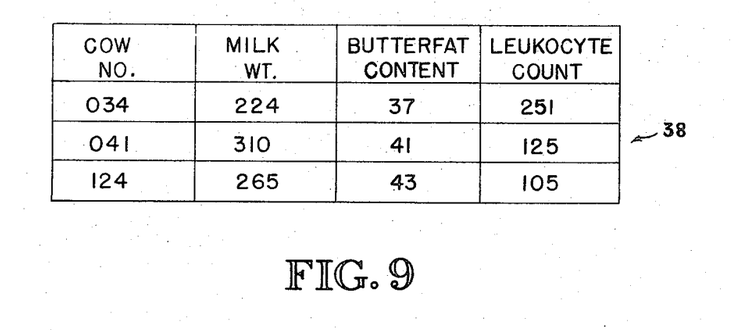
FIG. 9 illustrates a typical printout of a day's milk production.

The result is a printout as shown in FIG. 9 which indicates the cow's identifying number, the butterfat content, the leukocyte and weight of that particular cow's milk production for that particular milking. (For example, milk from cow No. 34 would weight 22.4 lbs., the butterfat content would be 3.7 percent, etc.) By reviewing the printout at the end of each milking, the dairyman can analyze each individual cow's milk production for that milking.

Figure 8:
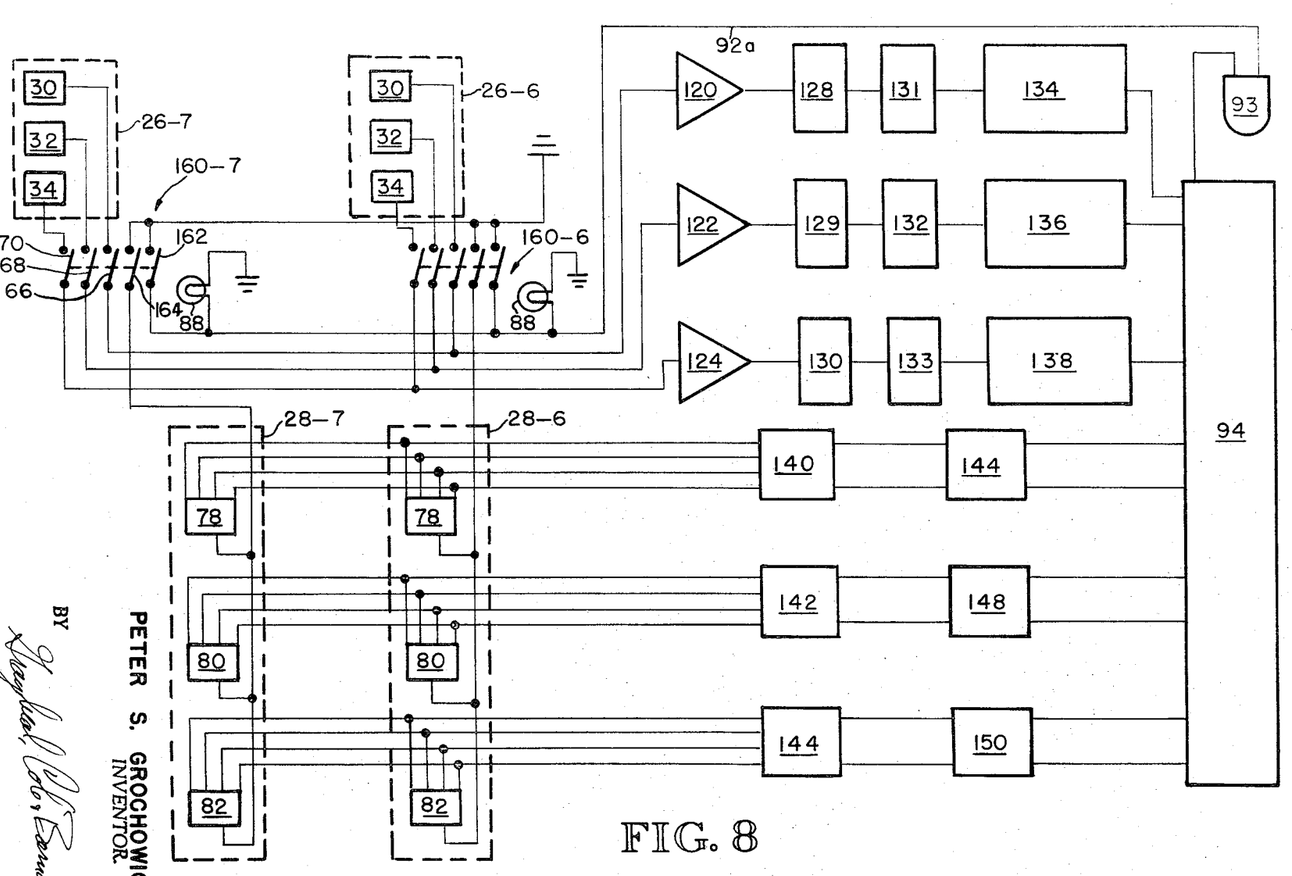
FIG. 8 illustrates the circuitry of a second embodiment.

The second embodiment of the present invention is illustrated in FIG. 8. In this second embodiment, there is, as in the first embodiment, a milk analyzing unit 26 and a cow identifying device 28 at each milk station 12. The butterfat sensing device 30, leukocyte sensing device 32 and weight sensing device 34 are the same as in the first embodiment, and each generates a voltage as an information signal. Also, as in the first embodiment, there is a printer 94 which records this information and relates it to the particular cow. The essential difference is in the manner which the voltage signals are transmitted to the printer 94.

With reference to FIG. 8, there are shown two of the milk analyzing units 26-7 and 26-6. Since the circuitry for each of the eight milk analyzing units 26 and cow indicating devices 28 are substantially identical, only two of these are shown herein for purposes of illustration.

At the mlik analyzing unit 26-7, there is an activating switch 160-7 which has five switching elements. The first switching element 162 performs substantially the same function as the switching element 92 of the first embodiment. That is to say, it functions to connect a voltage source to a line 92a to turn on all the warning lights 88 which are connected in parallel to the line 62a. Also, it transmits a voltage to the AND gate 93.

A second switching element 164 transmits a voltage to its respective cow identifying device 28-7. As in the first embodiment, the cow identifying device 28-7 has a unit input 78, a 10 input 80 and a 100 input 82. The identifying signals are transmitted to respective binary-to-decimal converters 140, 142, and 144, the outputs from which go through respective sets of amplifiers 146, 148 and 150, which in turn transmit output signals to the printer 94, as in the first embodiment.

The other three switching elements 166, 168 and 170 connect to the voltage signal outputs from, respectively, the butterfat sensing device 30, the leukocyte sensing device 32 and the weight sensing device 34 of its related milk analyzing unit 26-7. As in the first emboidment, the signal voltage from each of the devices 30, 32 and 34 are transmitted to, respectively, amplifiers 120, 122 and 124. The output from these amplifiers 120, 122 and 124 is converted to a decimal output as in the first embodiment which is in turn transmitted to the printer 94.

The mode of operation of the second embodiment is generally the same as in the first embodiment. When the individual cow 14 has been milked, the cow's identifying number is entered on the cow identifying unit 28, and the switch 160 is closed. This causes the warning lights to be turned on, and sends a signal to the printer 94 to enable it to print. Simultaneously it sends a signal from the cow identifying device 28 to the printer 94, and also sends signals from the three analyzing components 30, 32 and 34 to the printer 94. The result is a printout such as illustrated in FIG. 9.

What is claimed is:

1. An apparatus for analyzing the milk production of a plurality of cows being milked at a plurality of milk stations in a milk parlor, wherein an individual cow's milk production is collected through a respective containing transfer means, with the milk from several transfer means being transferred to a bulk tank, said apparatus comprising:
   a. a plurality of milk analyzing units at respective milking stations and operatively connected to a respective transfer means, each unit comprising:
      1. a butterfat sensing device operatively connected to its respective transfer means and arranged to provide a voltage signal having a proportional relationship to butterfat content of milk in its respective transfer means,
      2. a leukocyte sensing device operatively connected to its respective transfer means and arranged to provide a voltage signal having a proportional relationship to leukocyte content of milk in its respective transfer means, and
      3. a quantity sensing device operatively connected to its respective transfer means and arranged to provide a voltage signal having a proportional relationship to quantity of milk collected through its respective transfer means,
   b. a plurality of cow identification means, each at a respective milk station by which an individual identification of a cow whose milk production is being collected can be entered,
   c. a master unit to receive informational inputs from each of said analyzing units and each of said cow identification means and to present an informational output including each cow's identification with corresponding butterfat, leukocyte content and quantity of each cow's milk production,
   d. means to transmit signals from said analyzing units and cow identifying means to said master unit, and
   e. activating means at each station, each of which activating means is operatively connected to its respective cow identifying means and also operatively connected to its respective butterfat sensing device, leukocyte sensing device and quantity sensing device in a manner that operation of said activating means causes transmission through said transmitting means to the master unit the correlated signals of its respective butterfat sensing device, leukocyte sensing device, quantity sensing device and cow identifying means.

2. The apparatus as recited in claim 1, wherein said butterfat sensing device comprises means to transmit radiant energy through a portion of milk in its respective transfer containing means and means to sense the radiation transmitted through said milk portion and generate a voltage signal proportional to the light transmitted to the sensing means.

3. The apparatus as recited in claim 1, wherein said leukocyte sensing device comprises means to transmit an electric current through at least a portion of milk in its respective transfer means and current sensing means to produce an output voltage proportional to the current being transmitted through said milk portion.

4. The apparatus as recited in claim 1, wherein said container transfer means comprises a container to collect a cow's output, and said quantity sensing device comprises first weighing means operatively connected to its respective transfer container so as to be responsive to the weight of milk therein, and other means to generate a voltage signal proportional to the weight of milk in said transfer container.

5. The apparatus as recited in claim 1, wherein:
   a. said butterfat sensing device comprises means to transmit radiant energy through a portion of milk in its respective transfer means and means to sense the radiation transmitted through said milk portion and generate a voltage signal proportional to the light transmitted to the sensing means;
   b. said leukocyte sensing device comprises means to transmit an electric current through at least a portion of milk in its respective transfer means and current sensing means to produce an output voltage proportional to the current being transmitted through said milk portion, and
   c. said quantity sensing device comprises first quantity responsive means operatively connected to its respective transfer means, and other means to generate a voltage signal proportional to the quantity of milk collected through said transfer means.

6. The apparatus as recited in claim 5, including analog to digital converting means to receive output signals from said butterfat sensing device, said leukocyte sensing device, and said quantity sensing device and to transmit a numerical signal to said master unit.

7. The apparatus as recited in claim 7, wherein each milk analyzing unit is normally in a nontransmitting condition, and the activating means of each milk analyzing unit is arranged not only to transmit signals from each of its three related sensing devices to said master unit, and also transmits an identifying signal from the cow identification means, but also generates a signal to activate the master unit to record the cow's identification and information from each of the three sensing units.

8. The apparatus as recited in claim 7, wherein said switch means also transmits a signal to said other milking stations to indicate that said apparatus is in use.

9. The apparatus as recited in claim 1, wherein said signal transmitting means also includes indicating means at each milking station all of which are activated when any of said signal transmitting means is activated.

10. The apparatus as recited in claim 9, wherein said indicating means is characterized in that it generates a warning signal.

11. The apparatus as recited in claim 1, wherein said activating means is arranged to transmit an activating signal to said master unit, to activate warning means to indicate said apparatus is in use, and to transmit signals from each of the three sensing devices to said master unit.

12. The apparatus as recited in claim 1, wherein said activating means comprises switch means having a direct operative connection from both its respective cow identifying means and its respective analyzing unit to said master unit.

* * * * *

UNITED STATES PATENT OFFICE
CERTIFICATE OF CORRECTION

Patent No. 3,841,756           Dated October 15, 1974

Inventor(s)     Peter S. Grochowicz

It is certified that error appears in the above-identified patent and that said Letters Patent are hereby corrected as shown below:

Column 5, line 7, "Swithc" should be -- Switch --.

Column 6, line 6, "mlik" should be -- milk --.

Column 8, line 63, "7" (second occurance) should be -- 6 --.

Signed and sealed this 20th day of May 1975.

(SEAL)
Attest:

RUTH C. MASON
Attesting Officer

C. MARSHALL DANN
Commissioner of Patents
and Trademarks